United States Patent
Johnson (10) Patent No.: US 7,300,112 B2
(45) Date of Patent: Nov. 27, 2007

(54) FRAME ASSEMBLY FOR PASSENGER SEAT

(75) Inventor: Glenn A. Johnson, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/426,737

(22) Filed: Jun. 27, 2006

(65) Prior Publication Data

US 2006/0232117 A1    Oct. 19, 2006

Related U.S. Application Data

(62) Division of application No. 10/424,465, filed on Apr. 28, 2003, now Pat. No. 7,066,551.

(51) Int. Cl.
*A47C 7/02* (2006.01)
(52) U.S. Cl. ............... 297/452.18; 297/452.2; 297/232; 244/118.6; 244/122 R
(58) Field of Classification Search ........ 297/232, 297/248, 452.18, 452.19, 452.2; 244/118.6, 244/122 R
See application file for complete search history.

(56) References Cited

U.S. PATENT DOCUMENTS

| | | | |
|---|---|---|---|
| 4,489,978 A * | 12/1984 | Brennan | 297/232 |
| 4,498,649 A | 2/1985 | Toll | |
| 4,993,778 A * | 2/1991 | Colin et al. | 297/452.2 |
| 5,560,683 A | 10/1996 | Penley et al. | |
| 5,567,017 A | 10/1996 | Bourgeois et al. | |
| 5,575,533 A * | 11/1996 | Glance | 297/452.2 |
| 5,735,578 A | 4/1998 | Penley | |
| 5,775,642 A | 7/1998 | Beroth | |
| 5,890,768 A | 4/1999 | Beurteaux et al. | |
| 6,059,364 A | 5/2000 | Dryburgh et al. | |
| 6,375,268 B2 | 4/2002 | Okazaki et al. | |
| 6,669,143 B1 | 12/2003 | Johnson | |
| 6,799,805 B2 * | 10/2004 | Johnson | 297/452.2 |
| 6,802,568 B1 | 10/2004 | Johnson | |
| 6,824,213 B2 | 11/2004 | Skelly et al. | |

FOREIGN PATENT DOCUMENTS

EP    0 495 318 A1    7/1992

OTHER PUBLICATIONS

D.J. Sypeck and H.N.G. Wadley; "Cellular Metal Truss Cork Sandwich Structures"; Abstract—Metfoam Issue; Aug. 2002; pp. 1-16; Advanced Engineering Materials, Charlottesville, VA.

* cited by examiner

*Primary Examiner*—Laurie K. Cranmer
(74) *Attorney, Agent, or Firm*—Adams Evans P.A.

(57) ABSTRACT

A passenger seat frame assembly includes first and second seat frames, each defining a curved shape corresponding to the profile of an anatomically-appropriate seat bottom and seat back; a seat base for being attached to a supporting surface, the seat base being disposed centrally between the first and second seat frames; a first beam comprising a first hollow body having a first end attached to the first seat frame, a second end attached to the second seat frame, and a central portion disposed between the first and second ends. The central portion of the first beam is attached to the seat base. A baggage guard rail extends between the first and second seat frames. The baggage guard rail is loaded in tension and the first beam is loaded in compression.

25 Claims, 7 Drawing Sheets

FRAME ASSEMBLY FOR PASSENGER SEAT

CROSS-REFERENCE TO RELATED APPLICATIONS

This application is a Divisional of application Ser. No. 10/424,465, filed Apr. 28, 2003 now U.S. Pat. No. 7,066,551.

TECHNICAL FIELD AND BACKGROUND OF THE INVENTION

This invention relates to an aircraft passenger seat, particularly an aircraft passenger seat in which a single structural beam extends laterally across the front of the seat. Aircraft passenger seats are typically constructed from modular components, the size, weight and construction of which are dictated by many considerations, including fuselage dimensions, aesthetic and safety considerations. Many of these requirements are imposed by law or regulation. The lower seat chassis is constructed of leg modules, while the upper seat is constructed of section assembly modules. In prior art seating systems the leg modules and section assembly modules are connected by mounting both to a pair of parallel beams that extend laterally from one side of the seat or seat assembly to the other. This arrangement of the supporting structure of the seat increases the seat's weight and limits the available space for passengers.

Accordingly, there is a need for a passenger seat that has enhanced space, simplified design, and lighter weight.

SUMMARY OF THE INVENTION

The above-mentioned need is meet by the present invention, which according to one embodiment, provides a passenger seat frame assembly including: first second seat frames, each of the seat frames defining a curved shape corresponding to the profile of an anatomically-appropriate seat bottom and seat back; a seat base for being attached to a supporting surface, the seat base being disposed centrally between the first and second seat frames; a first beam comprising a first hollow body having a first end attached to the first seat frame, a second end attached to the second seat frame, and a central portion disposed between the first and second ends, the central portion of the first beam being attached to the seat base; and a baggage guard rail extending between the first and second seat frames, wherein the baggage guard rail is loaded in tension and the first beam is loaded in compression.

According to another embodiment of the invention, the passenger seat frame assembly further includes a second beam comprising a second hollow body extending between the first and second seat frames, wherein the second beam is loaded in tension.

According to another embodiment of the invention, the first hollow body defines a generally oval cross-section According to another embodiment of the invention, the first hollow body comprises carbon fibers.

According to another embodiment of the invention, a metallic cellular truss core material is disposed in the first hollow body.

According to another embodiment of the invention, the first hollow body comprises aluminum.

According to another embodiment of the invention, wherein the first hollow body comprises an amorphous alloy.

According to another embodiment of the invention,

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DESCRIPTION OF THE PREFERRED EMBODIMENT AND BEST MODE

Figure 1:
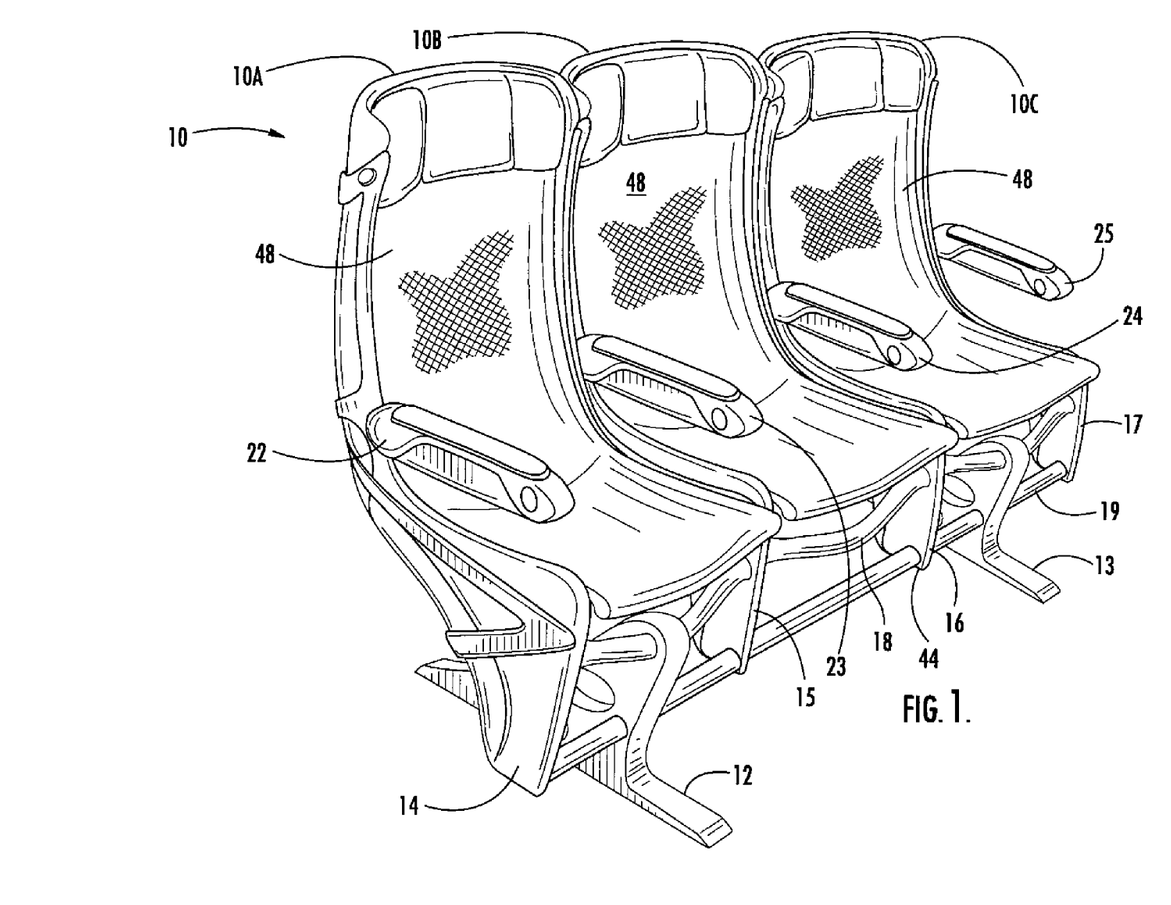
FIG. 1 is a perspective view of a three-seat assembly according to a preferred embodiment of the invention.
Figure 2:
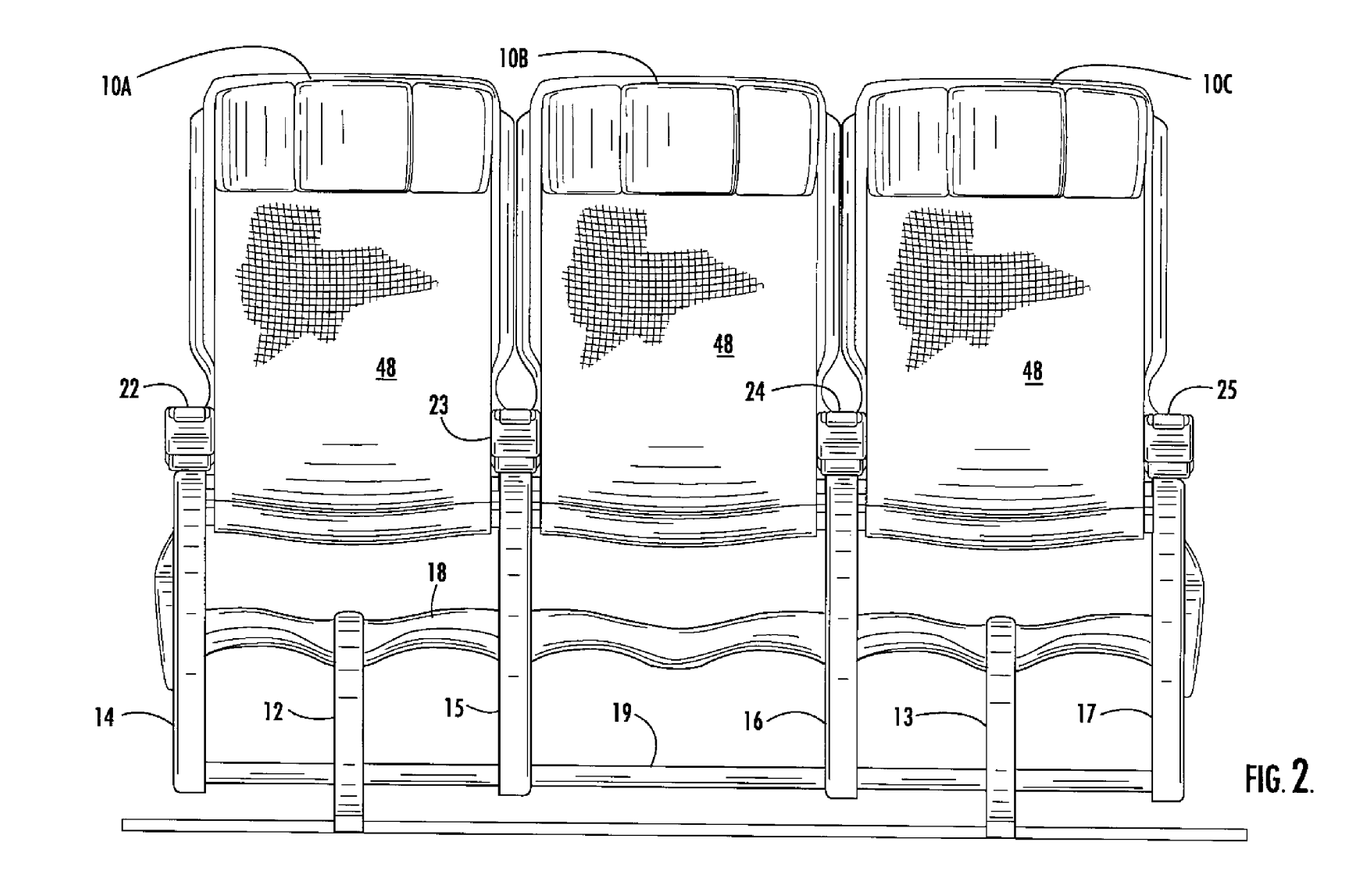
FIG. 2 is front view of the seat assembly shown in FIG. 1.

Referring now specifically to the drawings, a three-seat set according to the present invention is illustrated in FIGS. 1 and 2 and shown generally at reference numeral 10 and comprises individual joined seats 10A, 10B, 10C that are movable from an upright to a recline position without encroaching on an aft-seated passenger. This type of seating is conventionally referred to as "coach" or "main cabin" seating as distinct from larger and more complex first class or business class seating. As will be seen below, the features of this invention are also applicable to first and business class seating. The seat set 10 includes a seat base 11. The seat base 11 includes a pair of leg assemblies 12 and 13 for being attached to a supporting surface by means of conventional track fittings such as disclosed in applicant's U.S. Pat. Nos. 4,776,533; 5,169,091 and 5,871,318. Four seat frames 14, 15, 16 and 17 are connected by single laterally-extending beam 18. A baggage guard rail 19 prevents baggage stowed under the seats 10A, 10B, 10C from sliding forward into the leg area of the passengers.

The beam 18 represents a radical departure from conventional seat design, where a pair of parallel fore-and aft beams provide support to the entire seat structure. The beam 18 is oval in cross-section and downwardly curved laterally across the front of each of the seats 10A, 10B, 10C. This combination of the oval cross-section and the curve provides sufficient strength to support the entire on the leg assemblies 12 and 13, thus eliminating the need for a second beam.

Each seat 10A, 10B, 10C thus includes a pair of the shared, laterally spaced-apart seat frames 14, 15, 16 and 17, each of which has a curved shape generally corresponding to the profile of an anatomically-appropriate generally horizontal seat bottom and generally vertical seat back, and includes an extension to the floor. Arm rests 22, 23, 24 and 25 are pivotally-mounted on respective seat frames 14, 15, 16 and 17.

Each of the seats 10A, 10B, 10C, has a diaphragm 48 in the form of a fabric seat suspension material. The material 48 provides a seating surface and is stretched under tension onto curved, semi-rigid diaphragm supports (not shown) which are carried by seat frames in alignment with the curved shape of the seat frames.

Figure 3:
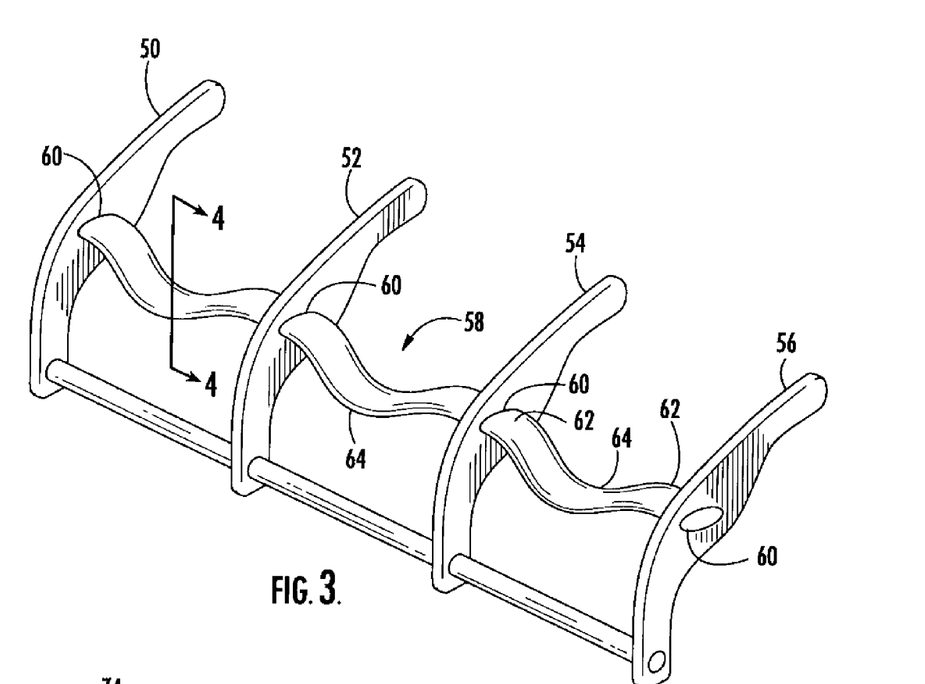
FIG. 3 is a perspective view of a portion of a seat frame assembly according to a preferred embodiment of the invention.

FIG. 3 shows a perspective view of a portion of a seat frame assembly. The seat frame assembly includes first, second, third, and forth spaced-apart seat frames labeled 50, 52, 54 and 56, respectively. A single tubular, curved beam 58 connects the seat frames. The beam 58 passes through mounting points which are defined by openings 60 formed through the seat frames. The beam 58 is similar in construction to the beam 18 described above and includes a plurality of spaced-apart mounting portions 62. A seat portion 64 is disposed between each pair of mounting portions 62. The beam 58 is curved such that seat portions 64 are laterally downwardly offset from the mounting portions 62. The beam 58 may be secured to the seat frames by any known method, for example by interference fit, welding, or adhesives.

Figure 4:
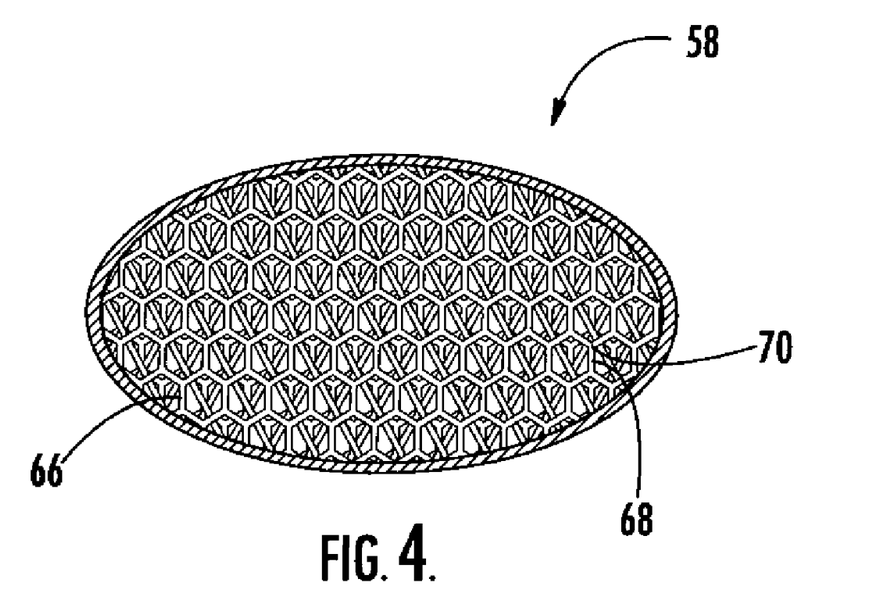
FIG. 4 is a view taken along lines 4-4 of FIG. 3.
Figure 5:
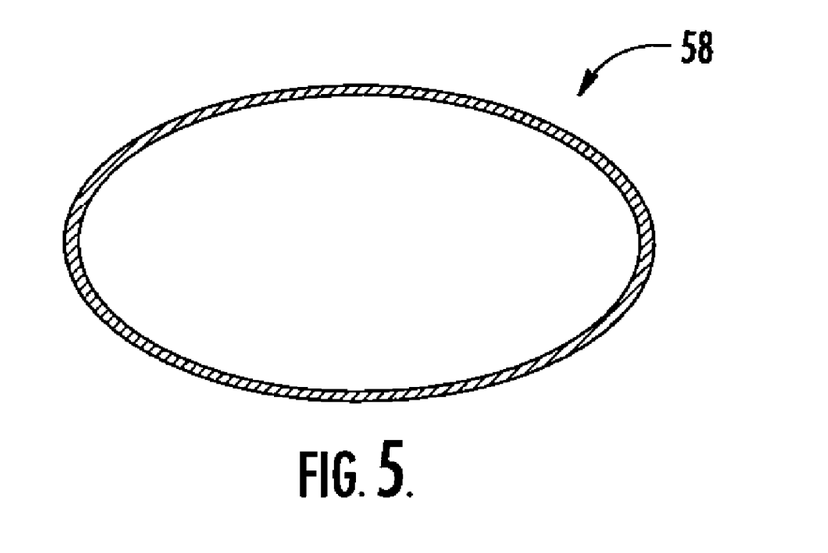
FIG. 5 is a view similar to FIG. 4 showing an alternative construction of the beam.

FIG. 4 shows a cross-section of the beam 58 shown in FIG. 3. The beam 58 comprises a body having a hollow interior. The body may be constructed of a material selected to give adequate strength and low weight, for example a carbon-fiber containing composite material. To increase the strength and stiffness of the beam 58, a low-density filler may be disposed inside the hollow body. One suitable filler is a metallic cellular truss core material 66 as depicted in FIG. 4. the cellular truss core material 66 is of a known type comprising a three-dimensional matrix of struts 68 connected at nodes 70 to create a low-density structural material. The cellular truss core material 66 may be joined to the inner surface of the beam 58, for example with an adhesive. It is also possible that the beam 58 may be left hollow and made of a different material, such as aluminum. An example of a beam constructed in this manner is shown in FIG. 5.

The beam 58 may also be constructed of an amorphous alloy of a known type. An amorphous alloy is an alloy which is glass-like in structure, lacking a crystalline lattice. Amorphous alloys have certain advantages over conventional alloys, for example they are capable of exhibiting yield strength greater than titanium, while having a weight and cost similar to aluminum. Amorphous alloys are resistant to work hardening and they can be formed into complex shapes in a manner similar to injection molding. One example of a suitable amorphous alloy has the following approximate composition, in weight percent: 41.2 zirconium, 22.5 beryllium, 13.8 titanium, 12.5 copper, nickel 10.0. Such alloys are available from Liquidmetal Technologies, Tampa, Fla. 33602 USA.

Figure 6:
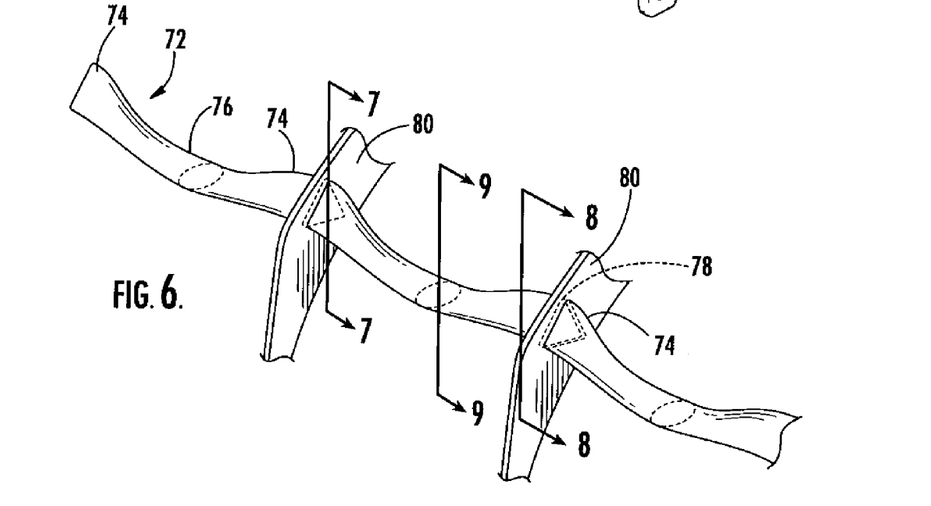
FIG. 6 is a perspective view of an alternative embodiment of a beam according the present invention.
Figure 7:
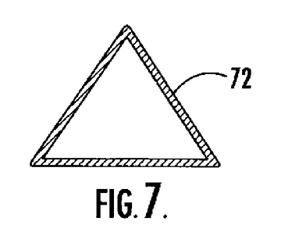
FIG. 7 is a view taken along lines 7-7 of FIG. 6.
Figure 8:
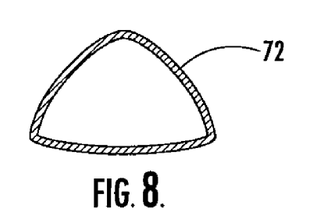
FIG. 8 is a view taken along lines 8-8 of FIG. 6.
Figures 9, 10:
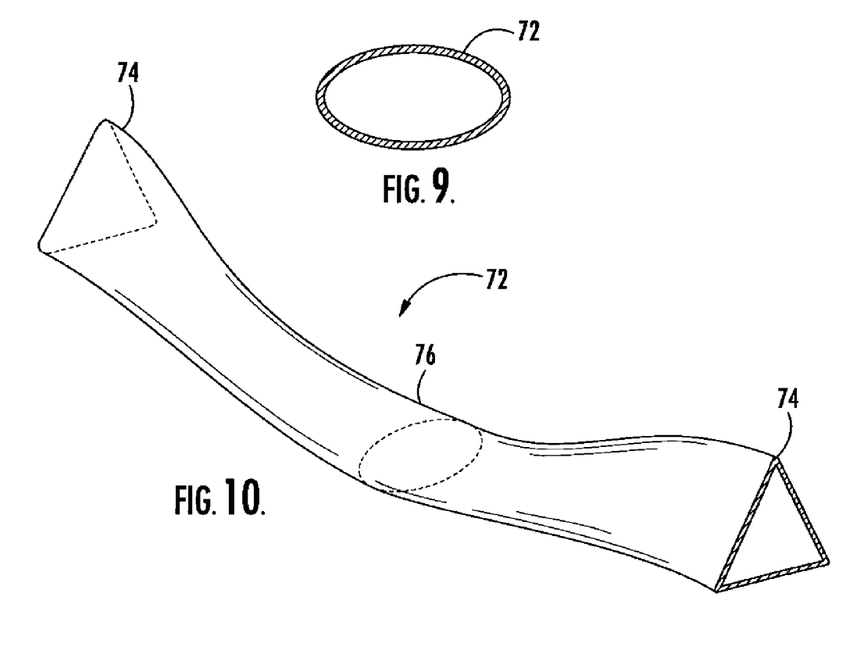
FIG. 9 is a view taken along lines 9-9 of FIG. 6.
FIG. 10 is a perspective view of a portion of a seat beam according to an alternative embodiment of the invention.

FIG. 6 shows a seat frame assembly incorporating an alternate embodiment of a seat beam. The beam 72 (which is shown in more detail in FIG. 10) has several spaced-apart mounting portions 74 each defining a first cross-section, and several seat portions 76 defining a second cross-section. As with the beam described above, the seat portions 76 of the beam 72 are laterally downwardly offset with respect to the mounting portions 74. The first cross-sections of the beam 72, shown in FIG. 7, are of a triangular shape in the illustrated example. This triangular shape is complimentary to triangular openings 78 in the seat frames 80. This provides an anti-rotation effect between the beam 72 and the seat frame 80. The seat portions 76 define a second cross-section which is generally oval, as shown in FIG. 8. The beam 72 has a minimum vertical extent at this location, which in conjunction with the lateral downward offset provides the greatest possible clearance under the seat. The cross-sectional shape of the beam 72 gradually varies between the generally oval shape at the seat portion 76 and the triangular mounting portions 74. A representative intermediate cross-section which has a plurality of curved sides is shown in FIG. 8.

Figures 13, 14:
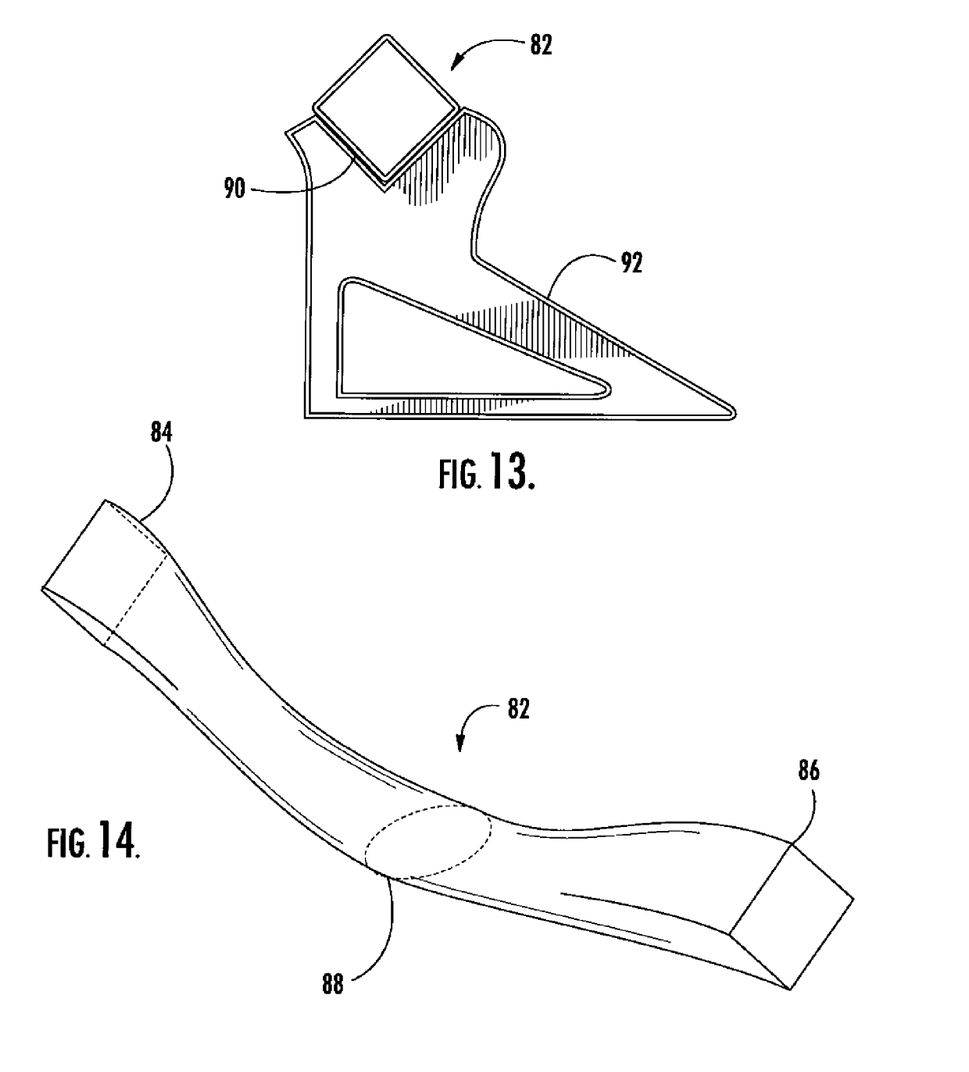
FIG. 13 is a side elevation view showing a portion of a seat frame assembly and a seat beam according to an alternative embodiment of the invention.
FIG. 14 is a perspective view of the seat beam shown in FIG. 13.

FIG. 14 shows yet another alternate embodiment of a seat beam. The beam 82 has first and second ends 84 and 86 defining a first cross-section and a seat portion 88 defining a second cross-section. Like the beams described above, the seat portion 88 of the beam 82 is laterally downwardly offset with respect to the first and second ends. The first cross-section of the beam 82 is of a 4-sided polygonal shape in the illustrated example. This polygonal shape is received in complimentary V-shaped openings 90 in each of the seat frames 92, as shown in FIG. 13. The seat portion 88 has a second cross-section which is generally oval.

Figures 11, 12:
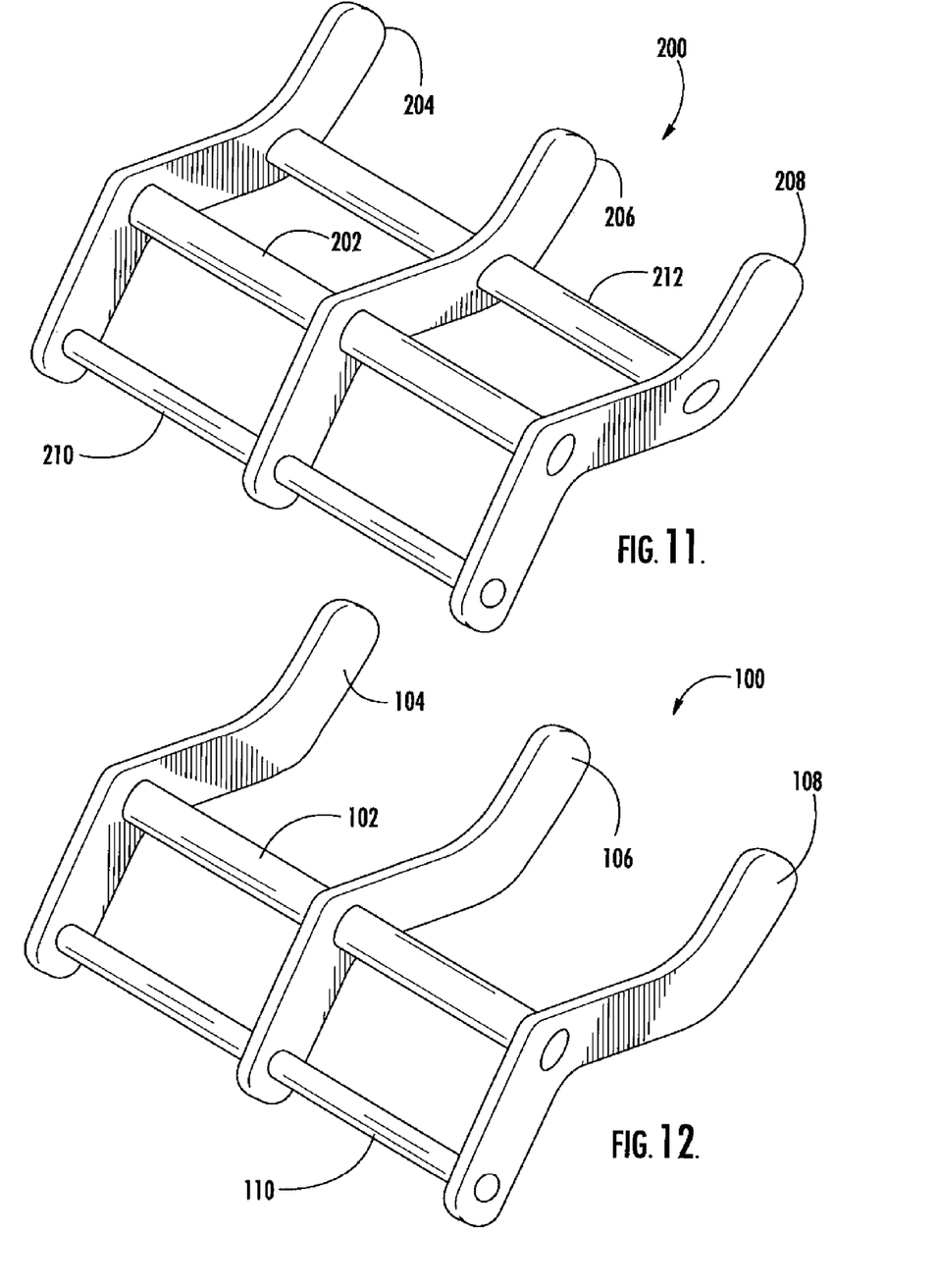
FIG. 11 is a perspective view of a portion of a seat frame assembly according to an alternative embodiment of the invention.
FIG. 12 is a perspective view of a seat frame assembly according to an alternative embodiment of the invention.

FIG. 12 shows an alternate embodiment of the seat frame assembly constructed in accordance with the present invention. The seat frame assembly 100 includes a first beam 102 which extends between spaced-apart seat frames 104, 106 and 108. The first beam 102 has a generally oval cross-section and is not curved. The first beam 102 may be constructed in similar fashion to the beams described above. For example, the first beam 102 may have a hollow body constructed of a material such as a carbon-fiber composite which is filled with a cellular truss core material. The seat frame assembly also includes a baggage guard rail 110 extending between the seat frames. In the illustrated example, the seat frame assembly is put together such that a desired preload is applied to the lateral members. The first beam 102 is loaded in compression, while the baggage guard rail 110 is loaded in tension. This may be accomplished by applying a stress to the seat frame members before final assembly. For example, the first beam 102 may be secured to the seat frames, then the entire seat frame assembly may be subjected to a clamping force pushing the seat frames 104 and 108 towards each other while the baggage guard rail 100 is installed and secured to the seat frames, then the clamping force may be released, resulting in a tension preload on the baggage guard rail 110. FIG. 11 illustrates a seat frame assembly 200 similar to the one shown in FIG. 12 which includes a first beam 202, a baggage guard rail 210, and a second beam 212 extending between spaced-apart seat frames 204, 206, and 208. The second beam 212 may be of similar construction to the first beam 102. The second beam 212 may be installed so at to be pre-loaded in tension in the same manner as the baggage guard rail described above.

A passenger seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat frame assembly comprising:
   first and second seat frames, each of the seat frames defining a curved shape corresponding to the profile of an anatomically-appropriate seat bottom and seat back;
   a seat base for being attached to a supporting surface, the seat base being disposed centrally between the first and second seat frames;
   a first beam comprising a first hollow body having a first end attached to the first seat frame, a second end attached to the second seat frame, and a central portion disposed between the first and second ends, the central portion of the first beam being attached to the seat base; and a baggage guard rail extending between the first and second seat frames, wherein the baggage guard rail and the first beam are dimensioned such that the baggage guard rail is loaded in tension and the first beam is loaded in compression.

2. The passenger seat frame assembly of claim 1 further including a second beam comprising a second hollow body extending between the first and second seat frames, wherein the first beam and the second beam are dimensioned such that the second beam is loaded in tension.

3. The passenger seat frame of claim 2 wherein the second hollow body defines a generally oval cross-section.

4. The passenger seat frame according to claim 2, wherein the second hollow body comprises carbon fibers.

5. The passenger seat frame according to claim 2, wherein a metallic cellular truss core material is disposed in the second hollow body.

6. The passenger seat frame according to claim 2, wherein the second hollow body comprises aluminum.

7. The passenger seat frame according to claim 2, wherein the second hollow body comprises an amorphous alloy.

8. The passenger seat frame of claim 1 wherein the first hollow body defines a generally oval cross-section.

9. The passenger seat frame according to claim 1, wherein the first hollow body comprises carbon fibers.

10. The passenger seat frame according to claim 1, wherein a metallic cellular truss core material is disposed in the first hollow body.

11. The passenger seat frame according to claim 1, wherein the first hollow body comprises aluminum.

12. The passenger seat frame according to claim 1, wherein the first hollow body comprises an amorphous alloy.

13. A method for assembling a passenger seat frame, comprising the steps of:

providing first and second seat frames, each of the seat frames defining a curved shape corresponding to the profile of an anatomically-appropriate seat bottom and seat back; a seat base for being attached to a supporting surface such that the seat base is disposed centrally between the first and second seat frames; a first beam comprising a first hollow body having a first end and a second end and a central portion disposed between the first and second ends, the central portion of the first beam being configured to be attached to the seat base;

securing the first end of the first beam to the first seat frame and the second end of the first beam to the second seat frame to form a seat frame assembly;

subjecting the seat frame assembly to a compressive force that acts to push the first seat frame and the second seat frame toward each other;

installing a baggage guard rail such that it extends between and is connected to the first and second seat frames; and releasing the compressive force such that the baggage guard rail is loaded in tension and the first beam is loaded in compression.

14. The method for assembling a passenger seat frame according to claim 13 further including a second beam comprising a second hollow body extending between the first and second seat frames, wherein the first beam and the second beam are dimensioned such that the second beam is loaded in tension.

15. The method for assembling a passenger seat frame according to claim 14 wherein the second hollow body defines a generally oval cross-section.

16. The method for assembling a passenger seat frame according to claim 14, wherein the second hollow body comprises carbon fibers.

17. The method for assembling a passenger seat frame according to claim 14, wherein a metallic cellular truss core material is disposed in the second hollow body.

18. The method for assembling a passenger seat frame according to claim 14, wherein the second hollow body comprises aluminum.

19. The method for assembling a passenger seat frame according to claim 14, wherein the second hollow body comprises an amorphous alloy.

20. The method for assembling a passenger seat frame according to claim 13 wherein the first hollow body defines a generally oval cross-section.

21. The method for assembling a passenger seat frame according to claim 13, wherein the first hollow body comprises carbon fibers.

22. The method for assembling a passenger seat frame according to claim 13, wherein a metallic cellular truss core material is disposed in the first hollow body.

23. The method for assembling a passenger seat frame according to claim 13, wherein the first hollow body comprises aluminum.

24. The method for assembling a passenger seat frame according to claim 13, wherein the first hollow body comprises an amorphous alloy.

25. A passenger seat frame assembly formed according to the method of claim 13.

* * * * *